Dec. 12, 1961  H. M. ZALEWSKI  3,012,475
METHOD OF COLLIMATING BINOCULARS
Filed Aug. 6, 1959  2 Sheets-Sheet 1
Fig. 1.
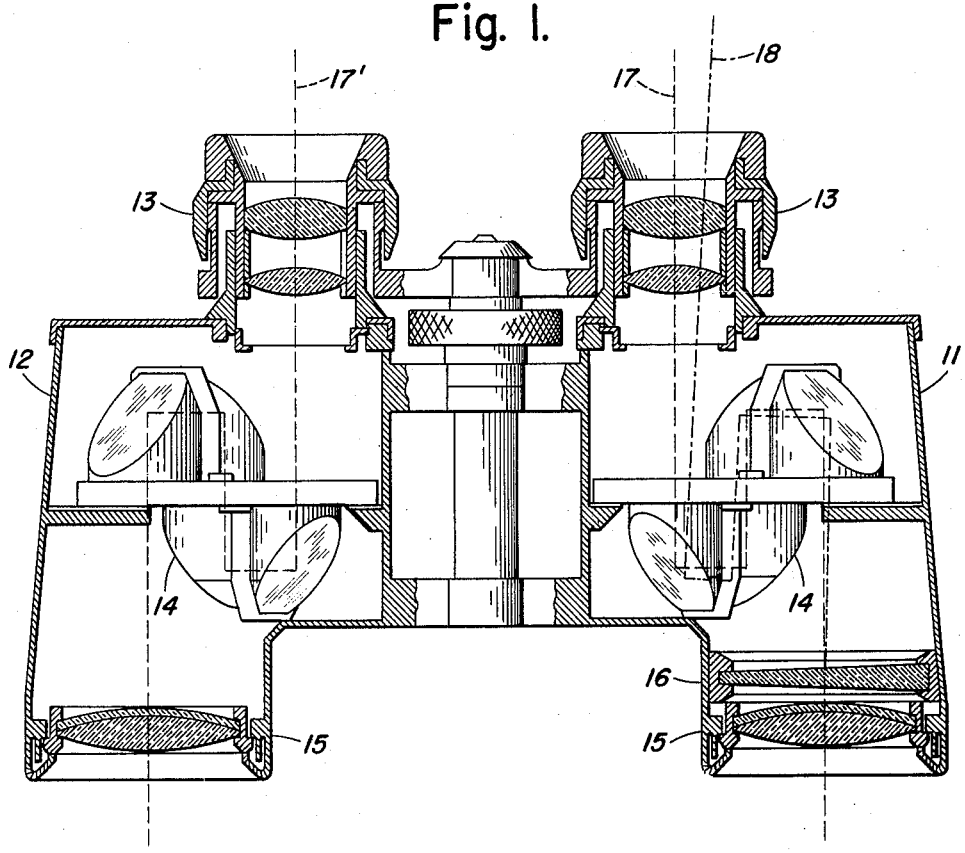
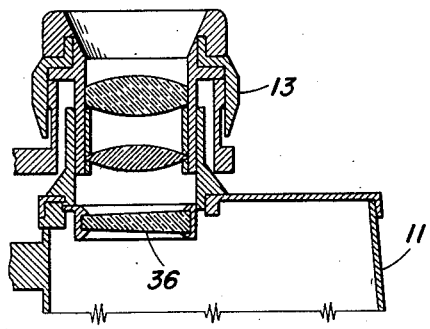
Fig. 3.
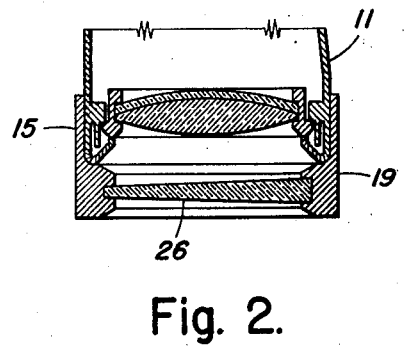
Fig. 2.
INVENTOR
Henry M. Zalewski
BY
AGENT Dec. 12, 1961 H. M. ZALEWSKI 3,012,475
METHOD OF COLLIMATING BINOCULARS
Filed Aug. 6, 1959 2 Sheets-Sheet 2
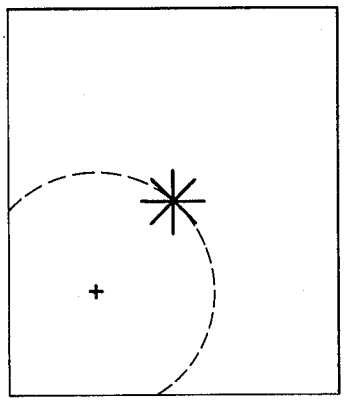
Fig. 7.
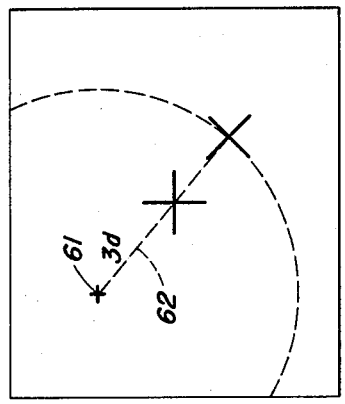
Fig. 6.
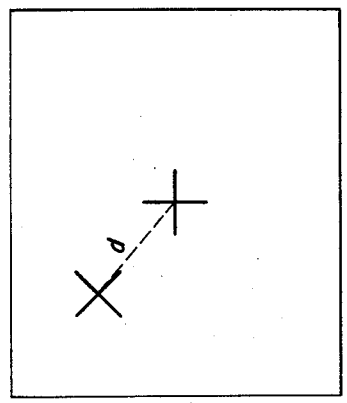
Fig. 5.
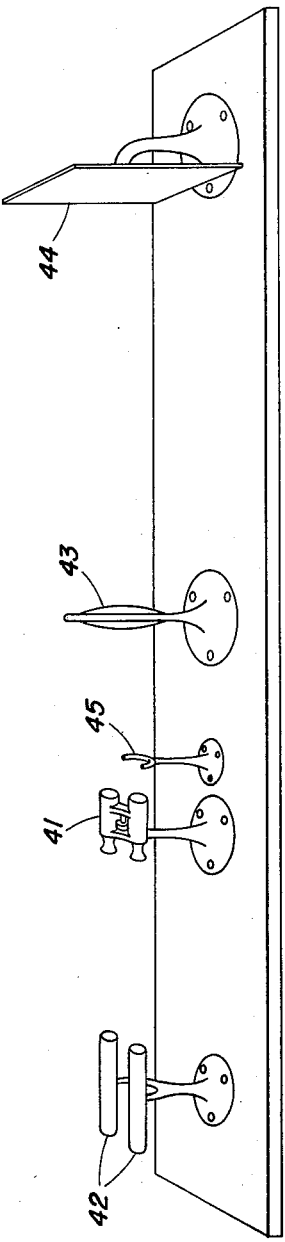
Fig. 4.
INVENTOR
Henry M. Zalewski
BY 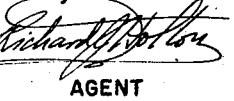
AGENT United States Patent Office 3,012,475
Patented Dec. 12, 1961

3,012,475
METHOD OF COLLIMATING BINOCULARS
Henry M. Zalewski, 237 Pershing Ave., Carteret, N.J.
Filed Aug. 6, 1959, Ser. No. 832,034
2 Claims. (Cl. 88—34)

This invention relates to a method of collimating binocular optical instruments, in particular binocular telescopes, and to a novel arrangement of apparatus used in such method, and to instruments collimated according to the method of this invention.

Binocular instruments, as the name indicates, are characterized by two separate ocular systems—one for each of the viewer's eyes—and frequently by two entirely separate optical trains having duplicate ocular, intermediate and objective elements.

In order for such instruments to function properly, it is essential that the duplicated portions of the system be optically equivalent with respect to magnification, focal length, etc., and also that they be properly collimated, i.e., so oriented that the effective optic axes of the duplicated elements are parallel as presented to the viewer. If the instrument is not properly collimated, it becomes necessary for the viewer to compensate for the defect by orienting his eyes to a slightly "wall-eyed" or "cross-eyed" relationship in order to produce on the retinas a pair of images that can be fused. If the defect in alignment of the instrument is severe, the required compensation will exceed the viewer's ability to accommodate, and he will see separate overlapping images which cannot be made to fuse. If the defect is less pronounced, the viewer will accommodate and see a fused image, and may not even be aware of the misalignment, but nevertheless will experience undue strain of the eye muscles and fatigue, resulting in headaches and other undesirable effects after relatively short periods of use of the instrument.

When the instrument is properly collimated, assuming that the elements are properly matched, the eyes are permitted to remain in the position of rest—i.e. in parallel orientation, as if directed to an object at a great distance.

In the assembly of binocular instruments, it is not particularly difficult to make a pair of equivalent optical trains, which merely requires that the elements—lenses, prisms, etc., be matched as to optical density or refractive index, ground to the same dimensions and curvatures, and assembled at equal spacings. The matching with respect to refractive index is relatively simple in practice, and is most conveniently accomplished in large-scale operations by making the matched elements from the same batch of glass, or by suitable controls to insure uniformity among successive batches of glass. There exists automatic or semi-automatic equipment suited to the grinding and assembly operations, and these are readily carried out without undue expenditure of time and skilled effort. In the collimation, however, there has to date been no simple inexpensive method whereby the final fine orientation of the optical axes to make them perfectly parallel could be carried out rapidly, accurately and inexpensively. This fact in part accounts for the difference in cost between well-made, carefully-collimated instruments and relatively inexpensive ones, even though the latter may have as good optics as the former. The collimation step is, moreover, essential as a practical matter. If it were possible, indeed, to assemble every element perfectly in its designed position with respect to the rest, there would be no need for collimation; the instrument would be fully aligned on completion of the assembly. In practice, it would be impractical, if not impossible, to make the assembly with such perfection. Moreover, the more complex the system, the more numerous are the possibilities for the cumulation of minute errors into a substantial misalignment.

One method that has been suggested was to accomplish the final alignment by displacing one of the optical elements, for example the objective, in one of the trains without disturbing the position of the assembly as a whole. In one such arrangement, one of the two objectives is placed in a slightly eccentric mount so that it could be displaced laterally away from its normal designed position and this displacement employed as the means for correcting minor variations in the relative alignment of the axes. This method overcame the above-mentioned difficulties involved in attempts to align one train as a unit relative to the other, and was successful to a considerable degree, but introduced additional difficulties. Thus, it involved the introduction of an additional departure from the designed characteristics of the system over and above that for which the adjustment was designed to compensate, and, while effective in correcting the gross effects of misalignment of the axis of the system as a whole, aggravated those errors associated with the misalignment of an individual curved element, such as coma, spherical aberration and astigmatism. For these reasons, this method was only partially effective, and could be used only to correct very small misalignments, which in turn necessitated comparatively great care in the position of the rest of the elements in the system.

An object of this invention, therefore, is to provide an improved method for collimating binocular optical instruments. Another object is to provide a method as aforesaid, which avoids the necessity of disturbing the designed alignment of any of the optical elements of the system. Other objects and advantages will become apparent from the following more complete description and claims.

Broadly, this invention contemplates a method for collimating a binocular optical instrument having two optical systems which comprises interposing in one of said systems an optical wedge effective to alter the alignment of the effective optical axis of the other of said systems while retaining the optical properties of said first system substantially unchanged except for the alignment of said axis.

In a particularly desirable embodiment, this invention contemplates a method for collimating a binocular optical instrument having two matched optical systems which comprises the steps of projecting a pair of aligned images, in parallel relationship and in a direction generally parallel to the optical axes of said optical systems, through said systems and onto a surface, inserting an optical wedge of known refractive strength in one of said systems and rotating said wedge about the axis of said system to a position in which the image projected through said system is displaced on said surface in a direction directly toward the image projected through the second of said systems, removing said wedge and inserting in place thereof a permanent wedge of refractive strength such that the ratio of the refractive strength of said permanent wedge to the refractive strength of said first wedge approximates the ratio of the initial distance between said two images on said surface in the absence of any wedge to the displacement on said surface of the image projected through said first system by the insertion of said first wedge, and orienting said permanent wedge to minimize the separation between said two images.

This invention also contemplates, as a new article of manufacture, a binocular optical instrument having two matched optical systems, and an optical wedge in one of said systems, said two systems having generally parallel but imperfectly aligned optic axes in the absence of said wedge, said wedge being of a refractive power such as to change the direction of a light ray by an amount approximating the angular difference in alignment between said axes and so oriented as to offset said difference.

Referring now to the figures,

FIGURE 1 is a cross-sectional view of a pair of binoculars according to a preferred embodiment of this invention.

FIGURE 2 is a cross-section of part of a pair of binoculars according to another embodiment of this invention.

FIGURE 3 is a cross-section of a portion of another pair of binoculars according to still another embodiment of this invention.

FIGURE 4 is a perspective view of a pair of binoculars mounted in a test bench, with a pair of aligned images being projected therethrough, at the start of the method according to this invention.

FIGURE 5 is a rendition of the images projected upon the projection target by the arrangement depicted in FIGURE 4.

FIGURE 6 is a rendition of the images projected on the target by the arrangement of FIGURE 4, with the addition of a wedge of known refractive power.

FIGURE 7 is a rendition of the images projected on the target by the same arrangement, but with a permanent wedge of the proper refractive power in place of the wedge first used.

In FIGURE 1, there is shown in cross-section a pair of binoculars having matched optical systems contained in separate housings 11 and 12. In each housing, in conventional manner, is contained an ocular system 13, a prism assembly 14 and an objective 15. In addition, housing 11 also contains, just behind the objective lens, an optical wedge 16. The effective optical axes of both systems are indicated by evenly dashed lines 17 and 17'. It will be noted that the axes, with the wedge in place, are substantially parallel, indicating that light rays which enter the objectives in parallel relationship will leave the ocular in parallel relationship. In the same figure, unevenly dashed line 18 represents the optic axis of the system when wedge 16 is removed. In this case, the axis of the system in housing 11 diverges from that in housing 12, in the direction going from the objective to the ocular. By the same token, light rays entering the objectives in parallel relationship would emerge from the oculars as divergent rays, causing severe discomfort or double vision to the user of the instrument. The magnitude of the error is somewhat exaggerated in the drawing for purposes of clarity.

In FIGURE 2, another embodiment of the invention is shown, which differs from that of FIGURE 1 in that wedge 26 is placed in front of, rather than behind the objective. This embodiment is equally operative, but is ordinarily not preferred because it does not give as finished an appearance. However, it is sometimes advantageous, for example where the removal of the objective and insertion of the wedge behind it would be inconvenient or impractical for one reason or another. It has, especially, the advantage that it permits the instrument to be hermetically sealed in a permanent fashion, as it avoids the possible necessity of disassembling it for collimation purposes.

FIGURE 3 shows an embodiment wherein the wedge 36 is placed between the ocular and the prism. This arrangement may also be used, but generally is less effective than that shown in FIGURE 1, it being generally preferable to make small corrections in the direction of the light rays near the objective end of the system, in preference to necessarily larger corrections farther along toward the ocular.

FIGURES 4, 5, 6 and 7 illustrate the method of carrying out the method of this invention. In FIGURE 4, a pair of binoculars 41 is mounted in a conventional test bench setup, with provision for directing through the two optical systems a pair of parallel-aligned images generated by projectors 42. The test bench is also provided with a large lens 42 and a projection target 44. The binoculars are so mounted that the central axes of the two optical systems thereof are symmetrically located on either side of the axis of lens 43, and target 44 is separated from lens 43 by a distance equal to the focal length of lens 43, all to the end that a pair of parallel images projected through the binoculars will be focused in superimposed registry on said target. Failure of images to register precisely indicates that the binoculars are not perfectly collimated, and the distance between the unregistered images on the target, since only small angles are involved, is almost exactly proportional to the angular amount of misalignment present.

The test bench setup also includes provision for the interposition of an optical wedge in front of one of the objectives, shown in FIGURE 4 as stand 45.

The effect of interposing wedges is shown in FIGURES 5, 6 and 7. FIGURE 5 shows a typical pattern produced by a pair of binoculars that are slightly out of alignment. It will be noted that the two images fail to register. The distance and direction by which they are separated are noted. In FIGURE 5 it may be assumed, by way of example, that the images are displaced by one unit of length in the direction indicated in the drawing. FIGURE 6 illustrates the image produced by the interposition of a wedge of known refractive power—say 1.5 diopters—in the stand 45. As the wedge is rotated in the stand, the image projected through it describes a circular path on the target, the intersection of the two lines following the locus indicated by the dashed circular arc. The center of the circle, indicated at 61, corresponds to the center of the image produced by the corresponding optical system of the binocular with the wedge removed. The wedge is rotated until a line from point 61 through the center of the movable image intersects the center of the fixed image, as indicated by line 62. The orientation of the wedge may then be marked for future reference in orienting the permanent wedge, although it is ordinarily just as convenient to orient the permanent wedge without reference to the test wedge. The radius of the locus circle, or what is the same thing, the amount by which the movable image is displaced when the test wedge is inserted, is then noted. In FIGURE 6, this distance is indicated as 3 units, i.e. 3 times the distance between the images in FIGURE 5. The proper refractive power of the permanent wedge, in diopters, bears the same ratio to the refractive power of the test wedge as the ratio of the initial distance between the two images to the displacement effected by the test wedge. Thus in the example chosen, the initial separation of the images on the target was one unit, and the displacement effected by the test prism was 3 units. The proper power for the permanent wedge is therefore ⅓ that of the test wedge, or ½ diopter.

FIGURE 7 shows the image produced upon the target when a wedge of the proper power is inserted in stand 45. The image describes the circle shown by the dashed line when the wedge is rotated in the stand. The wedge is then simply rotated in the stand until the two images coincide. The orientation of the wedge relative to the housing of the optical system is carefully indexed, and the wedge is mounted in the housing in the same relative position.

Providing the alignment errors in the instrument are reasonably small, so that low-power wedges (say up to about 3 diopters) suffice to compensate for them, the optical aberrations introduced by the use of wedges for collimation, for example the color fringes of chromatic aberration, are so small as to be negligible for most purposes. Where it is desired to correct for this type of aberration, it may be done in known manner by using compound elements. Such a compound element, in this case, would be made of a pair of wedges made of two different glasses having different specific dispersion values, so that the two wedges, being mutually compensating with respect to dispersion, would nevertheless exhibit a net refractive effect of the desired magnitude.

In carrying out the method of this invention, it is of course not necessary to use the test wedge each time, unless the instruments being collimated are of variable or unknown optical properties; in the production of similar instruments on a commercial basis, it would suffice merely to establish a calibration relating unit lengths of displacement on the target to wedge strength in diopters, and simply measure the image separation initially produced by each instrument.

In the method broadly considered, it is not necessary to resort to the particular test-bench setup described, although this has proven to be a highly advantageous arrangement. Other methods of determining the power of wedge required may be used without departing from the spirit of the invention. In this as in other respects, while this invention has been described by way of specific examples and illustrated by means of certain preferred embodiments, these are illustrative only, and the invention is not to be construed as limited, except as set forth in the following claims.

I claim:

1. A method for collimating a binocular optical instrument having two matched optical systems which comprises the steps of projecting a pair of aligned images, in parallel relationship and in a direction generally parallel to the optical axes of said optical systems, through said systems and onto a surface, inserting an optical wedge of known refractive strength in one of said systems and rotating said wedge about the axis of said system to a position in which the image projected through said system is displaced on said surface in a direction directly toward the image projected through the second of said systems, removing said wedge and inserting in place thereof a permanent wedge of refractive strength such that the ratio of the refractive strength of said permanent wedge to the refractive strength of said first wedge approximates the ratio of the initial distance between said two images on said surface in the absence of any wedge to the displacement on said surface of the image projected through said first system effected by the insertion of said first wedge, and orienting said permanent wedge to minimize the separation between said two images.

2. A method for collimating a binocular optical instrument having two matched optical systems which comprises the steps of projecting a pair of aligned images, in parallel relationship and in a direction generally parallel to the optical axes of said optical systems through said systems and onto a surface, noting the displacement between said images on said surfaces, inserting in one of said systems an optical wedge of such refractive power that the displacement of the corresponding image on said surface resulting from insertion of said wedge approximates the displacement required to produce on said surface a relationship between said two images indicative of parallel alignment, and orienting said wedge to produce said relationship.

References Cited in the file of this patent

UNITED STATES PATENTS

| | | |
|---|---|---|
| 1,355,954 | Fecker | Oct. 19, 1920 |
| 1,497,294 | Erfle | June 10, 1924 |
| 2,129,130 | Hammer | Sept. 6, 1938 |

FOREIGN PATENTS

| | | |
|---|---|---|
| 509,279 | Great Britain | July 13, 1939 |
| 520,886 | Great Britain | May 7, 1940 |